United States Patent
Aho et al.

(10) Patent No.: US 7,963,557 B2
(45) Date of Patent: Jun. 21, 2011

(54) AIRBAG FOR PROTECTING A VEHICLE OCCUPANT

(75) Inventors: Christian Aho, Trollhättan (SE); Dobrila Lucic, Kungälv (SE); Stëfan Kodmja, Vargarda (SE); Emma Svenbrant, Gothenburg (SE); Krestin Kuntzsch, Liung (SE); David Stow, Gothenburg (SE); Gustav Börjeson, Alingsas (SE)

(73) Assignee: Autoliv Development AB, Vargarda (SE)

( * ) Notice: Subject to any disclaimer, the term of this patent is extended or adjusted under 35 U.S.C. 154(b) by 62 days.

(21) Appl. No.: 11/660,853

(22) PCT Filed: Jul. 27, 2005

(86) PCT No.: PCT/EP2005/008129
§ 371 (c)(1),
(2), (4) Date: Nov. 15, 2007

(87) PCT Pub. No.: WO2006/021281
PCT Pub. Date: Mar. 2, 2006

(65) Prior Publication Data
US 2008/0296875 A1 Dec. 4, 2008

(30) Foreign Application Priority Data
Aug. 19, 2004 (DE) .......... 10 2004 040 090

(51) Int. Cl.
*B60R 21/16* (2006.01)
(52) U.S. Cl. .......... 280/743.1; 280/728.1; 280/729
(58) Field of Classification Search ........ 280/728.1, 280/729, 743.1
See application file for complete search history.

(56) References Cited

U.S. PATENT DOCUMENTS

| | | | | |
|---|---|---|---|---|
| 5,586,782 A * | 12/1996 | Zimmerman et al. | ..... | 280/730.2 |
| 5,735,572 A * | 4/1998 | Clark et al. | ..... | 297/216.13 |
| 5,895,070 A * | 4/1999 | Lachat | ..... | 280/730.2 |
| 5,906,391 A * | 5/1999 | Weir et al. | ..... | 280/729 |
| 6,349,964 B1 | 2/2002 | Acker | | |
| 6,364,348 B1 * | 4/2002 | Jang et al. | ..... | 280/730.2 |
| 6,478,329 B1 * | 11/2002 | Yokoyama | ..... | 280/729 |
| 7,063,350 B2 * | 6/2006 | Steimke et al. | ..... | 280/729 |
| 7,445,232 B2 * | 11/2008 | Takimoto | ..... | 280/729 |
| 7,503,582 B2 * | 3/2009 | Sendelbach et al. | ..... | 280/743.1 |
| 2003/0160433 A1 * | 8/2003 | Kumagai et al. | ..... | 280/729 |
| 2005/0062266 A1 * | 3/2005 | Steimke et al. | ..... | 280/730.2 |
| 2006/0071458 A1 * | 4/2006 | Sendelbach et al. | ..... | 280/729 |
| 2007/0200327 A1 * | 8/2007 | Kloss et al. | ..... | 280/740 |
| 2007/0228701 A1 * | 10/2007 | Yamamura | ..... | 280/730.2 |
| 2007/0267851 A1 * | 11/2007 | Svenbrant et al. | ..... | 280/729 |
| 2007/0284859 A1 * | 12/2007 | Kashiwagi | ..... | 280/730.2 |
| 2007/0290488 A1 * | 12/2007 | Taguchi et al. | ..... | 280/730.2 |

FOREIGN PATENT DOCUMENTS
EP 1122134 A1 * 8/2001
WO WO 03101788 A1 * 12/2003
* cited by examiner

*Primary Examiner* — Paul N. Dickson
*Assistant Examiner* — Barry Gooden, Jr.
(74) *Attorney, Agent, or Firm* — Brinks Hofer Gilson & Lione

(57) ABSTRACT

An airbag for protecting a vehicle occupant comprising a first and a second material layer each having edge regions, wherein the first and the second layers are sewn together along the edge regions. A fastening section adapted for attaching to a part of the vehicle and connecting to a gas generator configured to inflate the airbag with a gas in response to an accident. A first and a second chamber region disposed opposite a dividing seam, wherein each of the material layers includes a first and a second material section each matched to one of the first or second chamber regions.

21 Claims, 3 Drawing Sheets

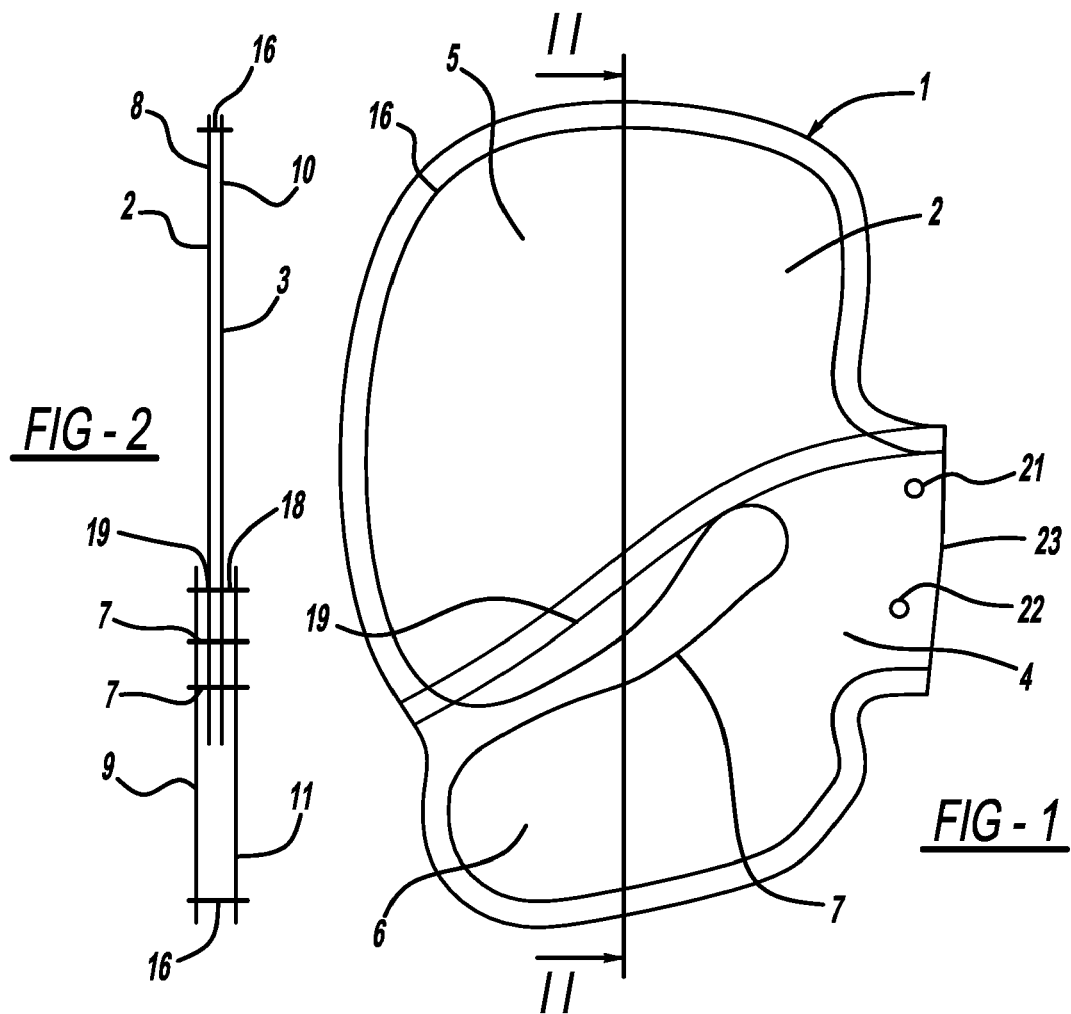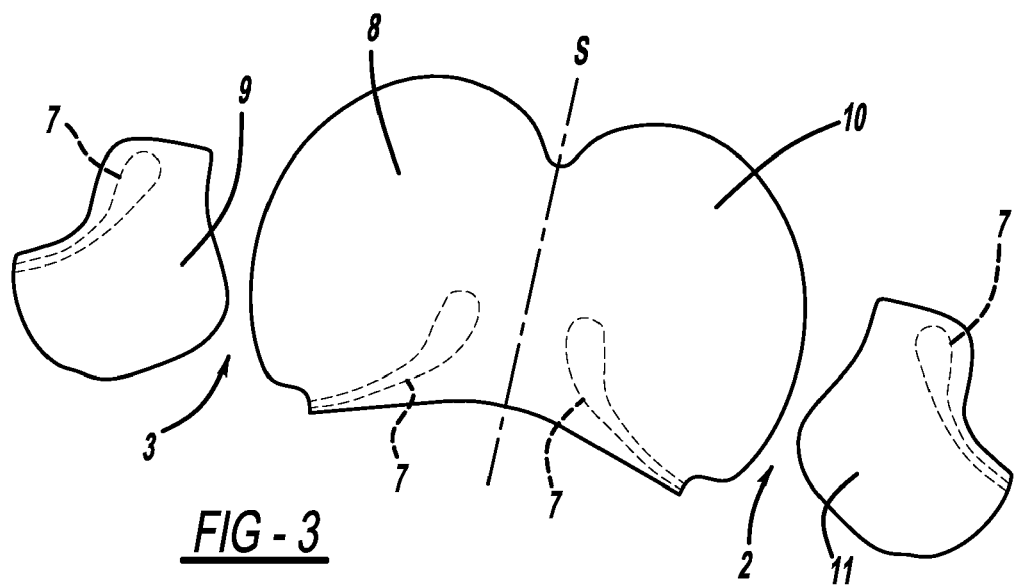

AIRBAG FOR PROTECTING A VEHICLE OCCUPANT

CROSS REFERENCE TO RELATED APPLICATIONS

This application claims priority to DE 102004040090.3 filed Aug. 19, 2004 and PCT/EP2005/008129 filed Jul. 27, 2005.

FIELD OF THE INVENTION

The invention relates to an airbag to protect a vehicle occupant.

BACKGROUND OF THE INVENTION

Conventional airbags having several chambers are usually manufactured out of two cuttings which are sewn along their edge regions and which demonstrate darts to separate the chambers. In some airbags, the respective chambers have the task of protecting individual body areas of an occupant. Because of the different masses of the individual body areas, varying levels of forces may act upon them during an accident. Moreover, certain body areas, such as the rib cage, may require reduced stress levels. One approach is to inflate the chambers at different rates using different gas pressures.

U.S. Pat. No. 6,349,964 suggests aside airbag having an upper chamber assigned to protecting the thorax of the occupant and a lower chamber assigned to protect the pelvis of the occupant with the chambers being separated by a dividing seam. Because of the requirements imposed on the respective chambers in a side impact, it is provided that different gas pressures are used to fill the chambers. Thus in particular, the chamber assigned to the pelvic region is intended to be filled with a higher pressure than that which fills the chamber assigned to the thoracic region of the occupant.

One disadvantage of this conventional arrangement of the side airbag is that the dividing seam may be subjected to high stresses because of the different pressures in the chambers, and thus there exists the possibility of tearing the seam, which may cause some pressure leakage.

The present invention seeks an airbag for a vehicle which may offer advantages over the prior art.

SUMMARY OF THE INVENTION

In at least one embodiment of the present invention, an airbag is provided. The airbag comprises a first and a second material layer, which are sewn to one another along their edge regions. The airbag has an opening which can be connected to a gas generator so that the gas generator can inflate the airbag during an accident. The airbag furthermore comprises a first and a second chamber region, which are separated from one another by a dividing seam. Each of the two material layers of the airbag comprises at least two material sections, each of which is respectively matched to the first or second chamber region. The material layers overlap in the region of the dividing seam, which fixes them.

Because of the overlapping in the region of the dividing seam, the dividing seam extends through four layers of the material sections. In this way, this region of the airbag is reinforced to better manage the force applied during the inflation process, minimizing seam tearing and the possibility of pressure leakage.

Moreover the separate material sections provide the possibility of introducing different fabric layers for the different application regions. Thus, very tearresistant fabrics may be used for higher stressed areas, whereas light, costeffective fabrics may be used for the remaining regions. In addition, specific material sections may be coated to minimize permeability and to additionally strengthen the fabric.

In at least one other embodiment of the present invention, the airbag includes another material layer which is fixed by the dividing seam in the same way as described in the foregoing paragraph, and which additionally protects the region around the dividing seam in the event of particularly high stresses resulting from very different gas pressures in the two chamber regions.

In at least another embodiment, the airbag is a side airbag to protect the vehicle occupants during a side impact. The chamber regions are assigned to the pelvic region and thoracic region of the occupant and can be filled with different gas pressures. In general, the chamber assigned to the pelvic region will be filled with a higher gas pressure than the chamber assigned to the thoracic region. Moreover, the airbag in the pelvic region may position itself particularly quickly and fix the center of gravity located in the pelvic region of the occupant in order to prevent the occupant from moving toward the side of the vehicle.

In order to maintain this high pressure in the airbag for the required time interval, the material sections assigned to the pelvic chamber region may include a particularly heavy fabric and can additionally be coated with a silicone layer or a film, so that the material sections are characterized by high tear resistance in addition to low gas permeability.

The material sections assigned to the thoracic region may be manufactured out of a more permeable fabric. Such a fabric is less expensive and has a lower weight.

Pursuant to another embodiment, the airbag is a curtain airbag and includes at least one additional chamber region and an additional dividing seam. In the curtain airbag, the central region below the opening, which can be connected to a gas generator, may be particularly stressed by the inflowing high-energy gases. The central chamber region therefore includes material sections made of a very heavy fabric, whereas the two external chamber regions may be manufactured out of less-heavy fabric sections.

BRIEF DESCRIPTION OF THE DRAWING

In order that the invention may be more readily understood, and so that further features thereof may be appreciated, the invention will now be described, by way of example, with references to the accompany drawings.

FIG. 1 is a top view of a side airbag;

FIG. 2 is a longitudinal section along line II-II of FIG. 1;

FIG. 3 is an assembly of an airbag pursuant to at least one embodiment;

DETAILED DESCRIPTION

Figure 1A:
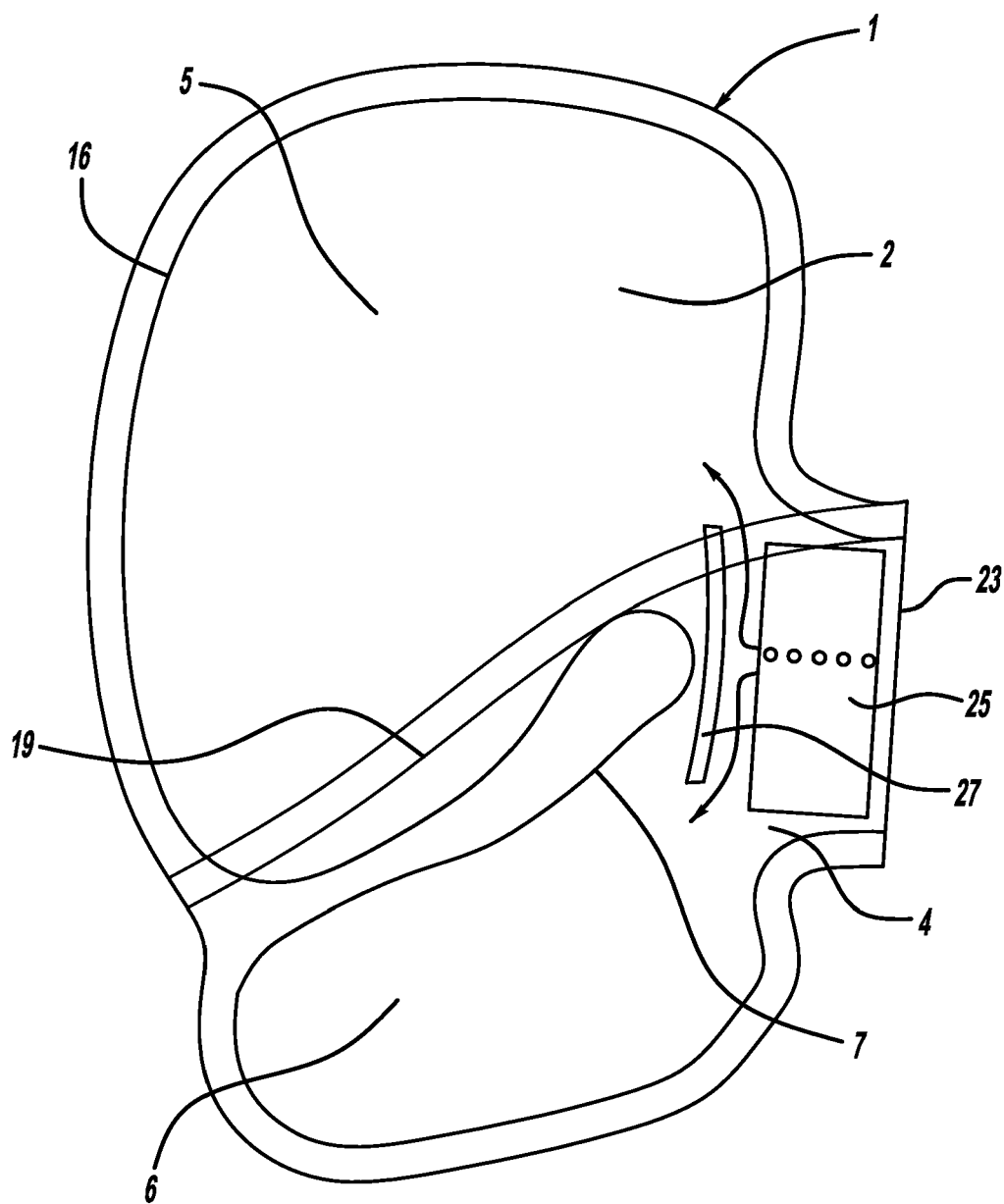
FIG. 1a is that which is depicted in FIG. 1 with a mounted gas generator.

The construction of an airbag, which here is configured in the form of a side airbag, will be described in more detail on the basis of FIGS. 1 and 2. Side airbags are normally arranged in the backrest of a vehicle seat or in the region of the side door.

The airbag 1 comprises two material layers 2, 3, which are manufactured out of fabric. These material layers 2, 3 are sewn to one another by a seam 16 along their external contour. The circumferential seam 16 leaves open the fastening region 4 of the side airbag, so that an opening 23 for connecting to a gas generator 25 (illustrated in FIG. 1a) is formed. Gas generators frequently utilize fastening bolts, which are guided through the fastening holes 21, 22 from the inside when the gas generator is inserted into the airbag and thereby fastening the airbag to the housing components.

A dividing seam 7, which divides the inflatable region into two chamber regions 5, 6, is configured in an approximately central region of the airbag 1. The dividing seam 7 is configured as a double seam, which extends from the edge region on the front side to the fastening region and is guided back to the front edge region in a curved course. As seen in FIG. 1, the end of the dividing seam 7 facing the gas generator 25 (illustrated in FIG. 1a) is disposed approximately at the height of the center of the opening 23 for the gas generator 25.

The dividing seam 7 is arranged in such a manner that the gas flowing from the gas generator 25 is guided directly into the two chamber regions 5, 6. Moreover, it is possible to introduce a deflector or a gas guide housing, for example, to selectively guide the gas jet. This is illustrated in FIG. 1a, where a deflector 27, which prevents the gases coming from the gas generator 25 from striking directly on the dividing seam 7, is disposed between the gas generator 25 and dividing seam 7. The gas generator 25, deflector 27 and dividing seam 7 are arranged so as to provide a wide separation of the two chamber regions 5, 6. This facilitates producing different pressures in the two chamber regions 5, 6.

Subsequent to sewing of the surrounding seam 16, side airbags 1 are usually turned inside out so that the seam 16 is disposed inside the airbag 1. The side airbag 1 can thus be tucked through the opening 23 in the fastening region 4 so that the dividing seam 7 can then be added.

As illustrated in FIG. 2, the side airbag 1 comprises four material sections 8, 9, 10 and 11. The sections 8 and 10 are assigned to the upper chamber region 5 and sections 9 and 11 are assigned to the lower chamber region 6. The pairs of material sections 8, 10 and 9, 11 are respectively assigned to one another and overlap in the central region, where they are fixed by the dividing seam 7. The material sections 8 and 9 of the first material layer 2 are held together by the seam 19 whereas the material sections 10 and 11 of the second material layer 3 are held together by the seam 18.

Within the overlapping region of the four material sections 8, 9, 10, 11, the upper material sections 8 and 10 are disposed inside the lower material sections 9 and 11. Pursuant to another embodiment (not illustrated), the lower sections 9 and 11 are disposed inside the upper sections 8 and 10.

The chamber 6 assigned to the pelvic region of a vehicle occupant may comprise a relatively heavy fabric, which is preferably coated. Fabrics in the range of 580 to 700 dtex can be used, for example.

The chamber 5 assigned to the thoracic region of the occupant may comprise a relatively permeable fabric and is preferably not coated. Fabrics in the range of 235 to 580 dtex may be used here.

FIG. 3 is a schematic illustration of the individual material sections 8, 9, 10, 11. The course of the dividing seam 7 is drawn dashed for the sake of clarity, although the dividing seam is added only after the individual material sections have been joined and sewn.

The two material sections 8 and 10 are formed from a single material layer, which has a butterfly-like shape. The fold axis, around which the material layer is folded, extends along axis of symmetry S. The two remaining material sections 9 and 11 are configured as separate pieces and are sewn onto the associated material sections in each material layer by means of the seams 18, 19.

Figure 4:
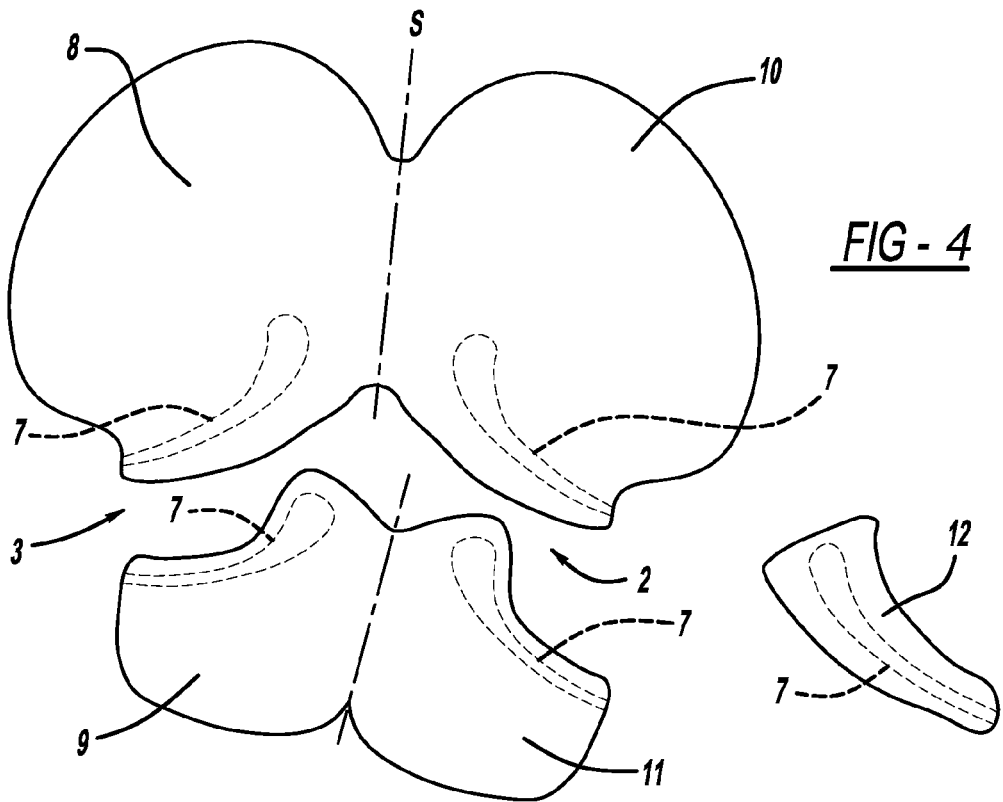
FIG. 4 is an assembly of an airbag pursuant to at least another embodiment.

Referring to FIG. 4, at least one other embodiment of the present invention is provided. Both the upper material sections 8 and 10 and the lower material sections 9 and 11 are configured as butterfly-like material layers, each of which is folded around its axis of symmetry after the two parts have been joined. In addition, another material layer 12, which ensures additional reinforcement in the region of overlap of the material sections, is added to this region.

The invention also includes other embodiments that are not illustrated in the figures. Thus all material sections 8, 9, 10, 11 can consist of separate parts and be fastened to one another.

Moreover, the term "axis of symmetry" should be understood more broadly. Slight deviations, caused by manufacture, in the shaping of an airbag and the individual material sections may exist so that the material sections assigned to one another are generally symmetric but can deviate from one another.

Figure 5:
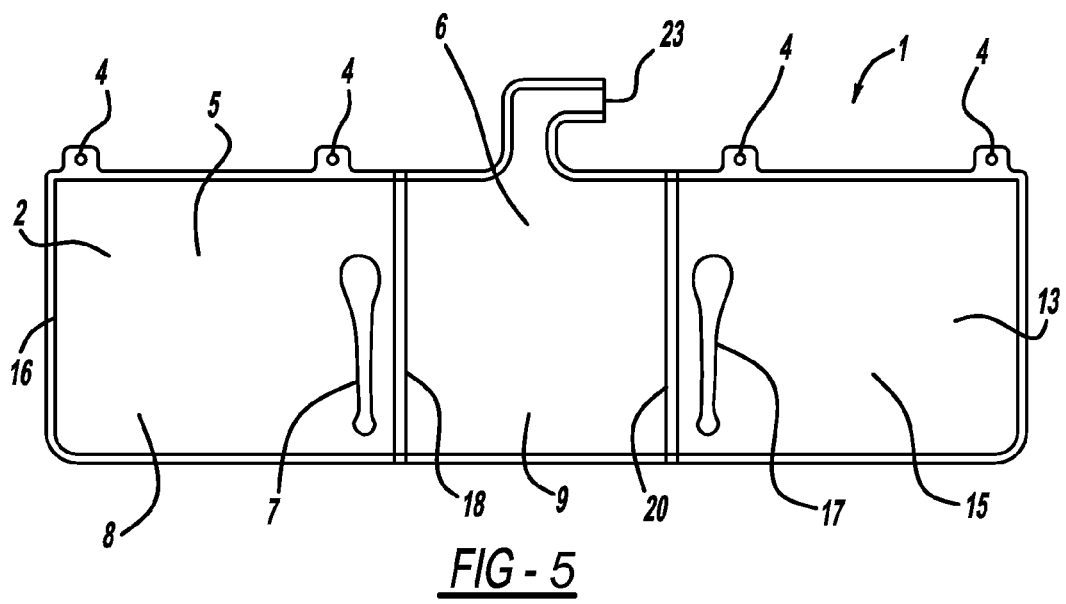
FIG. 5 is a top view of a curtain airbag.

FIG. 5 illustrates an airbag 1, which is a curtain airbag, the upper edge of which are usually fastened to fastening points 4 in the roof frame of the vehicle, where it can be accommodated.

The curtain airbag demonstrates a first material layer 2 and a second material layer (not shown), which are sewn along their external contour. To this end, the seam leaves open the region of the opening 23 so that a gas generator and/or a gas guide element can be inserted into the opening.

The chamber regions 5, 6 and 15 are partioned by dividing seams 7 and 17 so that two external and one central chamber are formed. In accordance with the preceding exemplary embodiment, the material sections 8, 10 and 9, 11 and 13, 14 assigned to one another are connected by seams, of which the seams 18 and 20 are visible here.

Because of the relatively high stresses when the gas enters, the centrally arranged chamber 6 is provided with a relatively heavy and therefore stable fabric, which can still be coated for extra reinforcement, whereas the external chambers 5 and 15 are manufactured out of plainer fabric to reduce weight and cost. Pursuant to one embodiment, a coated fabric having 700 dtex is chosen for the centrally arranged chamber, whereas an uncoated fabric in the range of 235 to 580 dtex suffices for the external chamber regions.

As a person skilled in the art will readily appreciate, the above description is meant as an illustration of implementation of the principles of this invention. This description is not intended to limit the scope or appreciation of this invention in that the invention is susceptible to modification, variation and change, without departing from the spirit of this invention, as defined in the following claims.

The invention claimed is:

1. An airbag for protecting a vehicle occupant comprising:
a first material layer and a second material layer each having edge regions, wherein the first and the second material layers are attached together at a surrounding seam along the edge regions, the first and the second material layers forming an inflatable region;
a fastening section adapted for attaching to a part of the vehicle and connected to a gas generator configured to inflate the airbag inflatable region with a gas in response to a vehicle collision; and
the inflatable region forming a first chamber region and a second chamber region which are separated from one another by a dividing seam, wherein each of the material layers includes a first material section and a second material section with the first and the second material sections of each of the material layer overlapping and joined together at joining seams for each of the material layer, wherein at least a portion of the dividing seam joins the overlapping of the first and the second material sections of both the first and the second material layers together via one or more stitches that extend continuously through the overlapping of the first and the second material sections of both the first and the second material layers, wherein each of the first material sections are matched to the first chamber region and the second material sections are matched to the second chamber region; and wherein one of the first and the second material sections of the first material layer and one of the first and the second material sections of the second material layer are from a single cutting, which defines a first butterfly-like shape with an axis of symmetry about its center.

2. The airbag according to claim 1 wherein the first material sections matched to the first chamber region include fabrics with different gas permeability or different tear-resistance than the second material sections matched to the second chamber region.

3. The airbag according to claim 1 wherein the single cutting is folded along the axis of symmetry so that the two material sections overlap.

4. The airbag according to claim 1 wherein the other material sections of the first material layer and the other material section of the second material layer form a second single cutting, which defines a second butterfly-like shape.

5. The airbag according to claim 1 wherein the second material sections matched to the second chamber region are coated with one of a silicone-like substance or a film.

6. The airbag according claim 1 wherein the first material sections matched to the first chamber region are disposed between the second material sections matched to the second chamber region proximate the dividing seam.

7. The airbag according to claim 1 wherein the second material sections matched to the second chamber region are disposed between the first material sections matched to the first chamber region.

8. The airbag according to claim 1 wherein the airbag further comprises a third chamber region and a second dividing seam, wherein each of the material layers further includes a third material section, wherein at least three material sections are included in one of the material layers.

9. The airbag according to claim 1 wherein the dividing seam is configured such that the gas flowing from the gas generator is directed into the two chamber regions.

10. The airbag according to claim 1 wherein the airbag is a side protection airbag for mounting to a vehicle side structure or within a vehicle seat.

11. The airbag according to claim 10 wherein the first chamber region of the airbag is for protecting a thorax and the second chamber region is for protecting a pelvic region of a vehicle occupant.

12. The airbag according to claim 1 wherein the first material sections matched to the first chamber region include substantially similar fabric and the second material sections matched to the second chamber region include substantially similar fabric.

13. The airbag according to claim 12 wherein the first material sections matched to the first chamber region are made out of a comparatively more porous fabric than the second material sections matched to the second chamber region.

14. The airbag according to claim 12 wherein the second material sections matched to the second chamber region are made out of a comparatively heavier fabric than the first material sections matched to the first chamber region.

15. An airbag for protecting a vehicle occupant comprising:
a first material layer and a second material layer each having edge regions, wherein the first and the second material layers are attached together at a surrounding seam along the edge regions, the first and the second material layers forming an inflatable region;
a fastening section adapted for attaching to a part of the vehicle and connected to a gas generator configured to inflate the airbag inflatable region with a gas in response to a vehicle collision; and
the inflatable region forming a first chamber region and a second chamber region which are separated from one another by a dividing seam, wherein each of the material layers includes a first material section and a second material section with the first and the second material sections of each of the material layer overlapping and joined together at joining seams for each of the material layer, wherein at least a portion of the dividing seam joins the overlapping of the first and the second material sections of both the first and the second material layers together via one or more stitches that extend continuously through the overlapping of the first and the second material sections of both the first and the second material layers, wherein each of the first material sections are matched to the first chamber region and the second material sections are matched to the second chamber region; and
wherein the overlapping formed by the material sections includes a fifth material layer which is disposed adjacent to one of the material layers and fixed by the dividing seam.

16. The airbag according to claim 15 wherein the first material sections matched to the first chamber region include fabrics with different gas permeability or different tear-resistance than the second material sections matched to the second chamber region.

17. The airbag according to claim 15 wherein the first material sections matched to the first chamber region include substantially similar fabric and the second material sections matched to the second chamber region include substantially similar fabric.

18. An airbag for protecting a vehicle occupant comprising:
a first material layer and a second material layer each having edge regions, wherein the first and the second material layers are attached together at a surrounding seam along the edge regions, the first and the second material layers forming an inflatable region;
a fastening section adapted for attaching to a part of the vehicle and connected to a gas generator configured to inflate the airbag inflatable region with a gas in response to a vehicle collision; and
the inflatable region forming a first chamber region and a second chamber region which are separated from one another by a dividing seam, wherein each of the material layers includes a first material section and a second material section with the first and the second material sections of each of the material layer overlapping and joined together at joining seams for each of the material layer, wherein at least a portion of the dividing seam joins the overlapping of the first and the second material sections of both the first and the second material layers together via one or more stitches that extend continuously through the overlapping of the first and the second material sections of both the first and the second material layers, wherein each of the first material sections are matched to the first chamber region and the second material sections are matched to the second chamber region; and wherein the airbag is a curtain airbag for mounting proximate a roof frame of the vehicle.

19. The airbag according to claim 18 wherein the first material sections matched to the first chamber region include fabrics with different gas permeability or different tear-resistance than the second material sections matched to the second chamber region.

20. An airbag for protecting a vehicle occupant comprising:

a first material layer and a second material layer each having edge regions, wherein the first and the second material layers are attached together at a surrounding seam along the edge regions, the first and the second material layers forming an inflatable region;

a fastening section adapted for attaching to a part of the vehicle and connected to a gas generator configured to inflate the airbag inflatable region with a gas in response to a vehicle collision; and the inflatable region forming a first chamber region and a second chamber region which are separated from one another by a dividing seam, wherein each of the material layers includes a first material section and a second material section with the first and the second material sections of each of the material layer overlapping and joined together at joining seams for each of the material layer, wherein at least a portion of the dividing seam joins the overlapping of the first and the second material sections of both the first and the second material layers together via one or more stitches that extend continuously through the overlapping of the first and the second material sections of both the first and the second material layers, wherein each of the first material sections are matched to the first chamber region and the second material sections are matched to the second chamber region; and wherein the dividing seam has an end facing towards the gas generator which is disposed approximately at a height at a center of an opening for the gas generator.

21. The airbag according to claim 20 wherein the first material sections matched to the first chamber region include fabrics with different gas permeability or different tear-resistance than the second material sections matched to the second chamber region.

* * * * *

UNITED STATES PATENT AND TRADEMARK OFFICE
CERTIFICATE OF CORRECTION

| | | |
|---|---|---|
| PATENT NO. | : 7,963,557 B2 | |
| APPLICATION NO. | : 11/660853 | |
| DATED | : June 21, 2011 | |
| INVENTOR(S) | : Christian Aho et al. | |

It is certified that error appears in the above-identified patent and that said Letters Patent is hereby corrected as shown below:

<u>On the Title Page</u>

Item (75), "Inventors:", after "Kuntzsch", replace "Liung" with --Ljung--.

<u>In the Claims</u>

In column 6, claim 15, line 19, after "each of the material" replace "layer" with --layers--.

In column 6, claim 15, line 21, before "wherein at least a portion" replace "layer" with --layers--.

In column 6, claim 18, line 61, after "each of the material" replace "layer" with --layers--.

In column 6, claim 18, line 63, before "wherein at least a portion" replace "layer" with --layers--.

In column 8, claim 20, line 4, after "each of the material" replace "layer" with --layers--.

In column 8, claim 20, line 6, before "wherein at least a portion" replace "layer" with --layers--.

Signed and Sealed this
Twenty-second Day of November, 2011

David J. Kappos
*Director of the United States Patent and Trademark Office*